(12) United States Patent
Wang et al.

(10) Patent No.: US 11,373,443 B2
(45) Date of Patent: Jun. 28, 2022

(54) METHOD AND APPRATUS FOR FACE RECOGNITION AND COMPUTER READABLE STORAGE MEDIUM

(71) Applicant: UBTECH ROBOTICS CORP LTD, Shenzhen (CN)

(72) Inventors: Yue Wang, Shenzhen (CN); Jun Cheng, Shenzhen (CN); Yepeng Liu, Shenzhen (CN); Yusheng Zeng, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 111 days.

(21) Appl. No.: 17/105,667

(22) Filed: Nov. 27, 2020

(65) Prior Publication Data
US 2022/0044006 A1  Feb. 10, 2022

(30) Foreign Application Priority Data

Aug. 5, 2020 (CN) .......................... 202010776692.4

(51) Int. Cl.
*G06V 40/16* (2022.01)
*G06K 9/62* (2022.01)
(Continued)

(52) U.S. Cl.
CPC ......... *G06V 40/169* (2022.01); *G06K 9/6234* (2013.01); *G06T 3/4007* (2013.01);
(Continued)

(58) Field of Classification Search
CPC .. G06V 40/169; G06V 40/165; G06V 40/167; G06V 2201/07; G06V 40/172;
(Continued)

(56) References Cited

U.S. PATENT DOCUMENTS

2020/0265219 A1* 8/2020 Liu .................. G06N 20/00
2022/0036617 A1* 2/2022 Biswas ............. G06T 13/205

FOREIGN PATENT DOCUMENTS

CN    111460939 A    7/2020

OTHER PUBLICATIONS

"Face image super resolution based on two-layer cascade neural network", Jiapei Liu et al. Computer Engineering and Applications. http://kns. cnki.net/kcms/detail/11.2I27.tp.20190918.1107.011. html, pp. 1-8.

* cited by examiner

*Primary Examiner* — Phuoc Tran

(57) ABSTRACT

The present disclosure provides a method and an apparatus for face recognition and a computer readable storage medium. The method includes: inputting a to-be-recognized blurry face image into a generator of a trained generative adversarial network to obtain a to-be-recognized clear face image; inputting the to-be-recognized clear face image to the feature extraction network to obtain a facial feature of the to-be-recognized clear face image; matching the facial feature of the to-be-recognized clear face image with each user facial feature in a preset facial feature database to determine the user facial feature best matching the to-be-recognized clear face image as a target user facial feature; and determining a user associated with the target user facial feature as a recognition result. Through this solution, the accuracy of the recognition of blurry faces can be improved.

20 Claims, 8 Drawing Sheets

Input a to-be-recognized blurry face into a generator of a trained generative adversarial network to obtain a to-be-recognized clear face Input the to-be-recognized clear face to the feature extraction network to obtain a facial feature of the to-be-recognized clear face Match the facial feature of the to-be-recognized clear face with each user facial feature in a preset facial feature database to determine the user facial feature best matching the to-be-recognized clear face as a target user facial feature Determine a user associated with the target user facial feature as a recognition result

(51) Int. Cl.
*G06T 3/40* (2006.01)
*G06T 5/00* (2006.01)
*G06T 5/50* (2006.01)

(52) U.S. Cl.
CPC ............... *G06T 5/003* (2013.01); *G06T 5/50* (2013.01); *G06V 40/165* (2022.01); *G06V 40/167* (2022.01); *G06V 2201/07* (2022.01)

(58) Field of Classification Search
CPC .. G06K 9/6234; G06K 9/6256; G06T 3/4007; G06T 5/003; G06T 5/50; G06N 3/0454
See application file for complete search history.

METHOD AND APPRATUS FOR FACE RECOGNITION AND COMPUTER READABLE STORAGE MEDIUM

CROSS REFERENCE TO RELATED APPLICATIONS

The present disclosure claims priority to Chinese Patent Application No. 202010776692.4, filed Aug. 5, 2020, which is hereby incorporated by reference herein as if set forth in its entirety.

BACKGROUND

1. Technical Field

The present disclosure relates to image processing technology, and particularly to a method and an apparatus for face recognition as well as a computer readable storage medium.

2. Description of Related Art

Face recognition technology is currently widely used in the technology of security monitoring and identity authentication. However, the current generative adversarial network (GAN) based face deblurring methods only improve the quality of the blurry face with the clarity and intuitive experience, while ignore the unique features of the blurry face. As a result, the accuracy of blurry face recognition is still low.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

Figure 1:
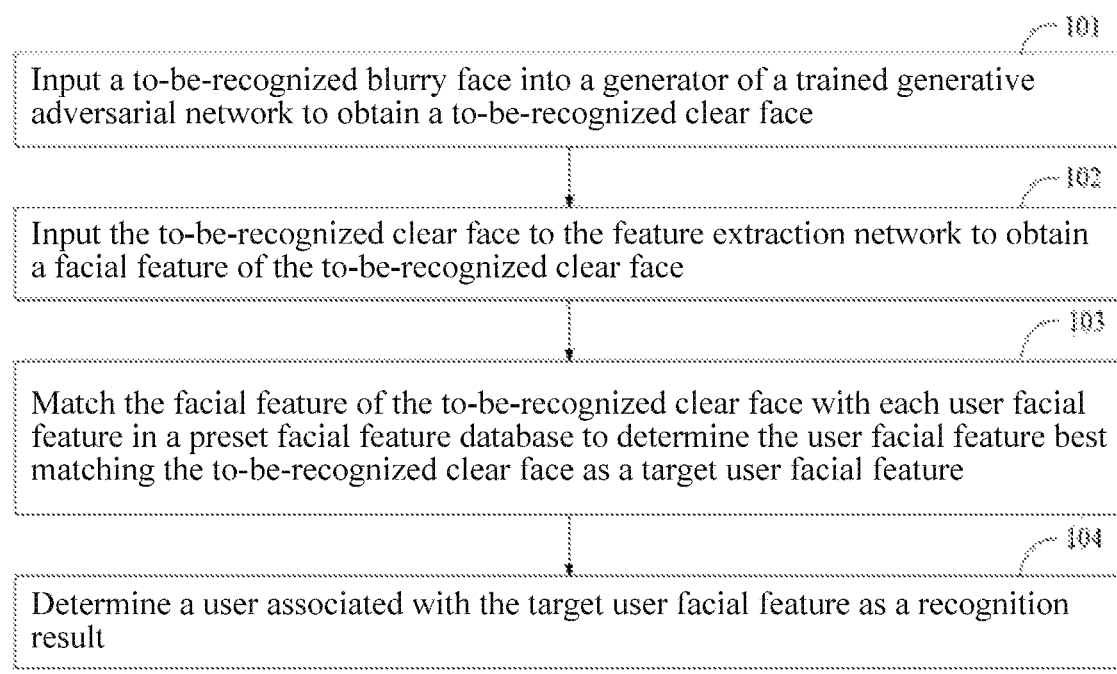
FIG. 1 is a flow chart of a face recognition method according to an embodiment of the present disclosure.
Figure 7:
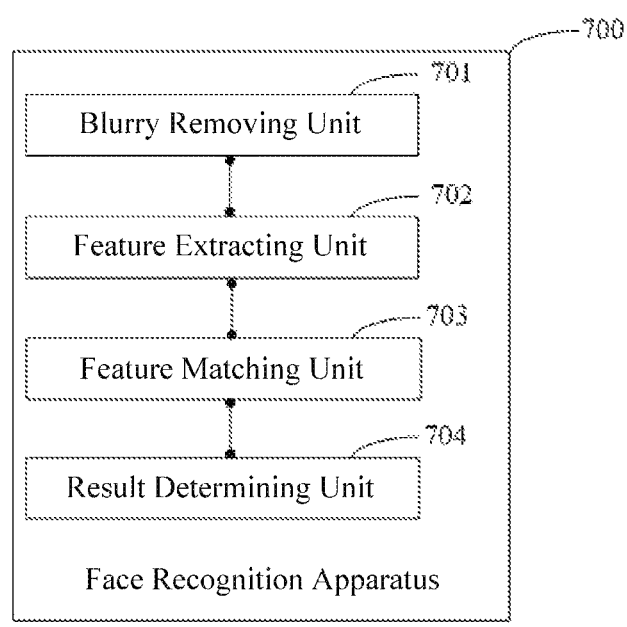
FIG. 7 is a schematic block diagram of a face recognition apparatus according to an embodiment of the present disclosure.
Figure 8:
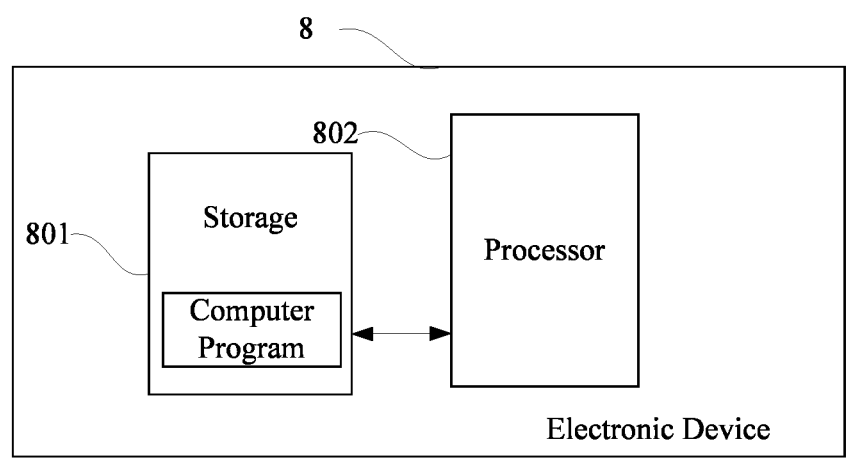
FIG. 8 is a schematic block diagram of an electronic device according to an embodiment of the present disclosure.

The following describes a face recognition method provided by an embodiment of the present disclosure. FIG. 1 is a flow chart of a face recognition method according to an embodiment of the present disclosure. In this embodiment, a face recognition method is provided. The method is a computer-implemented method executable for a processor, which may be implemented in a face recognition apparatus as shown in FIG. 7 or an electronic device as shown in FIG. 8. As shown in FIG. 1, the face recognition method includes the following steps.

101: inputting a to-be-recognized blurry face image into a generator of a trained generative adversarial network to obtain a to-be-recognized clear face image.

In this embodiment, the method is executed by an electronic device (e.g., a mobile phone, a tablet computer, a notebook computer, or a desktop computer) having a camera, and at least a part of its related data (e.g., instructions for implementing the method and temporary file generated during executing the method, and the input to-be-recognized blurry face image) is stored in the electronic device. The to-be-recognized blurry face image is input through the camera. The electronic device can train the generative adversarial network based on a preset clear-blurry face image set and a trained feature extraction network in advance. The generative adversarial network includes a generator and a discriminator. In which, the generator includes a key point detection encoder and a decoder. The key point detection encoder is for detecting key points of the blurry face image inputted to the generator. During training the generative adversarial network, the generative adversarial network will be coupled to the trained feature extraction network so that, for example, an output of the generator is coupled to each of an input of the discriminator and an input of the trained feature extraction network, that is, the output of the generator can not only be input to the discriminator for discrimination, but also can be input to the feature extraction network for feature extractions. The loss of the discrimination is merely associated with a discrimination result of the discriminator, while the loss of the generator is not only merely associated with discrimination result of the discriminator but is also associated with the key point detection result of the key point detection encoder and a feature extraction result of the feature extraction network. Based on the loss of the discriminator and the loss of the generator, the generator and the discriminator can be continuously optimized. After the generative adversarial network trained, only the generator is put into use, and the discriminator can be discarded. That is, in this embodiment, only the generator of the generative adversarial network is actually put into use. The generator can deblur the input to-be-recognized blurry face image to obtain the to-be-recognized clear face image that retains facial features.

In some embodiments, in the case that the electronic device has captured an image of a to-be-recognized face through the camera, it can first detect the quality of the image of the to-be-recognized face based on a preset quality detection model to determine whether the image of the to-be-recognized face is blurry. If the image of the to-be-recognized face is blurry, the image of the to-be-recognized face is determined as the to-be-recognized blurry face image, and step 101 and subsequent steps are executed. As an example only, the quality detection model can use a blur detection algorithms such as Brenner gradient function, Tenengrad gradient function, or Laplacian gradient function to determine whether the image of the to-be-recognized face is blurry, which is not limited herein.

In one embodiment, the clear-blurry face image set is a training sample of the generative adversarial network. In which, the clear-blurry face image set includes a plurality of clear-blurry face image pairs, where each clear-blurry face image pair includes a clear face image and a blurry face image, and the difference between the clear face image and the blurry face image is only in their blur degree.

In one embodiment, the feature extraction network is for extracting facial features, and is composed of a convolutional neural network (CNN). Unlike traditional feature extraction methods such as histogram of oriented gradient (HOG) and scale-invariant feature transform (SIFT), the CNN can extract global features that are not easy to be discovered by humans.

In an example, the training method of the above-mentioned feature extraction network includes steps of: taking a clear face image as a training sample, where the size of the face contained in the clear face image is a preset size such as 128*128 pixels, and the upper-lower range of the face included in the clear face image is from the chin to the top of the forehead, and the left-right range of the face include at least both ears; and training the feature extraction network as a classification network. In which, each person is an independent category. For example, if there are 3 clear face images of person 1, these 3 clear face images belong to the category of person 1; and if there are 5 clear face images of person 2, these 5 clear face images belong to the category of person 2. After the training is completed, the softmax classification layer that is in the last layer is removed while the fully connected layer in the second last layer is retained, then the output of the fully connected layer is the facial feature extracted by the feature extraction network, where the form of the facial feature is a feature vector.

It should be noted that, the training sample used by the feature extraction network is not the clear face image in the above-mentioned clear-blurry face image set that composes the clear-blurry face image pair, but is the clear face image obtained from otherwise. That is, the training sample of the feature extraction network is different from the training sample of the generative adversarial network.

102: inputting the to-be-recognized clear face image to the feature extraction network to obtain a facial feature of the to-be-recognized clear face image.

In this embodiment, the to-be-recognized clear face image output by the generator will be input into the feature extraction network. That is, after the trained feature extraction network is obtained, the feature extraction network can not only be used to train the generative adversarial network (that is, used in the training process of the generative adversarial network), but also can be used to extract the facial feature of the to-be-recognized clear face image (that is, used in the application process of the generative adversarial network).

103: matching the facial feature of the to-be-recognized clear face image with each user facial feature in a preset facial feature database to determine the user facial feature best matching the to-be-recognized clear face image as a target user facial feature.

In this embodiment, the electronic device can have a facial feature database stored in advance locally or in the cloud server, where the facial feature database stores the user facial feature of each registered user.

In an example, one registered user corresponds to only one user facial feature in the facial feature database. The electronic device can match the facial feature of the to-be-recognized clear face image with each user facial feature in the facial feature database, and the result of the matching can be represented as similarity. Thus, the user facial feature that best matches the to-be-recognized clear face image, that is, the user facial feature with the highest similarity, can be obtained, and the user facial feature can be determined as the target user facial feature.

In an example, the construction process of the above-mentioned facial feature database is as follows. The electronic device can first obtain the user face image of each registered user, and then input each user face image to the trained feature extraction network (that is, the feature extraction network in step 102) to obtain the user facial feature of each user, thereby constructing the facial feature database.

In an example, the result of the matching can be represented through cosine similarity, and the electronic device can calculate the cosine similarity between the facial feature of the to-be-recognized clear face image and each user facial feature and determine that the higher the cosine similarity, the higher the matchingness. Finally, the obtained user facial feature corresponding to the highest cosine similarity is the user facial feature that best matches the to-be-recognized clear face image, and the user facial feature can be determined as the target user facial feature.

In one embodiment, to avoid misrecognition, the electronic device can also set a cosine similarity threshold in advance. For example, the cosine similarity threshold may be set to 0.75. The highest cosine similarity will be determined as qualified and the corresponding user facial feature can exactly match the to-be-recognized clear face image only when the calculated highest cosine similarity is larger than the cosine similarity threshold. Otherwise, if the cosine similarity is less than or equal to the cosine similarity threshold, it is determined that the highest cosine similarity is not qualified, and the corresponding user facial feature does not match the to-be-recognized clear face image. For example, assuming that the calculated maximum cosine similarity is 0.2, it is obviously far less than the set cosine similarity threshold of 0.75, which means that the to-be-recognized clear face image is not the image of the face of any registered user. Therefore, when the calculated maximum cosine similarity is less than or equal to the above-mentioned cosine similarity threshold, a rejection message can be output. The rejection message is for indicating that the to-be-recognized blurry face is the face of an illegal user (that is, a non-registered user), and the subsequent operations to be performed can be determined according to the application scenario. For example, in the application scenario of employee check-in, it can prompt the specified user (e.g., a user from the personnel department) whether to enter the user registration process after outputting the rejection message; in the application scenario of security monitoring, it can trigger a buzzer to alarm after outputting the rejection message so as to remind that there may be an illegal user trying to break in and a certain security risk is posed.

104: determining a user associated with the target user facial feature as a recognition result.

In this embodiment, since each user facial feature is uniquely associated with a registered user, the user associated with the above-mentioned target user facial feature can be determined as the recognition result; that is, the to-be-recognized blurry face can be determined as the face of the user.

It should be noted that, in this embodiment, the feature extraction network used in the training phase and application phase of the generative adversarial network is the same feature extraction network that has been trained, that is, the feature extraction network in step 101 and step 102 is the same feature extraction network that has been trained.

Figure 2:
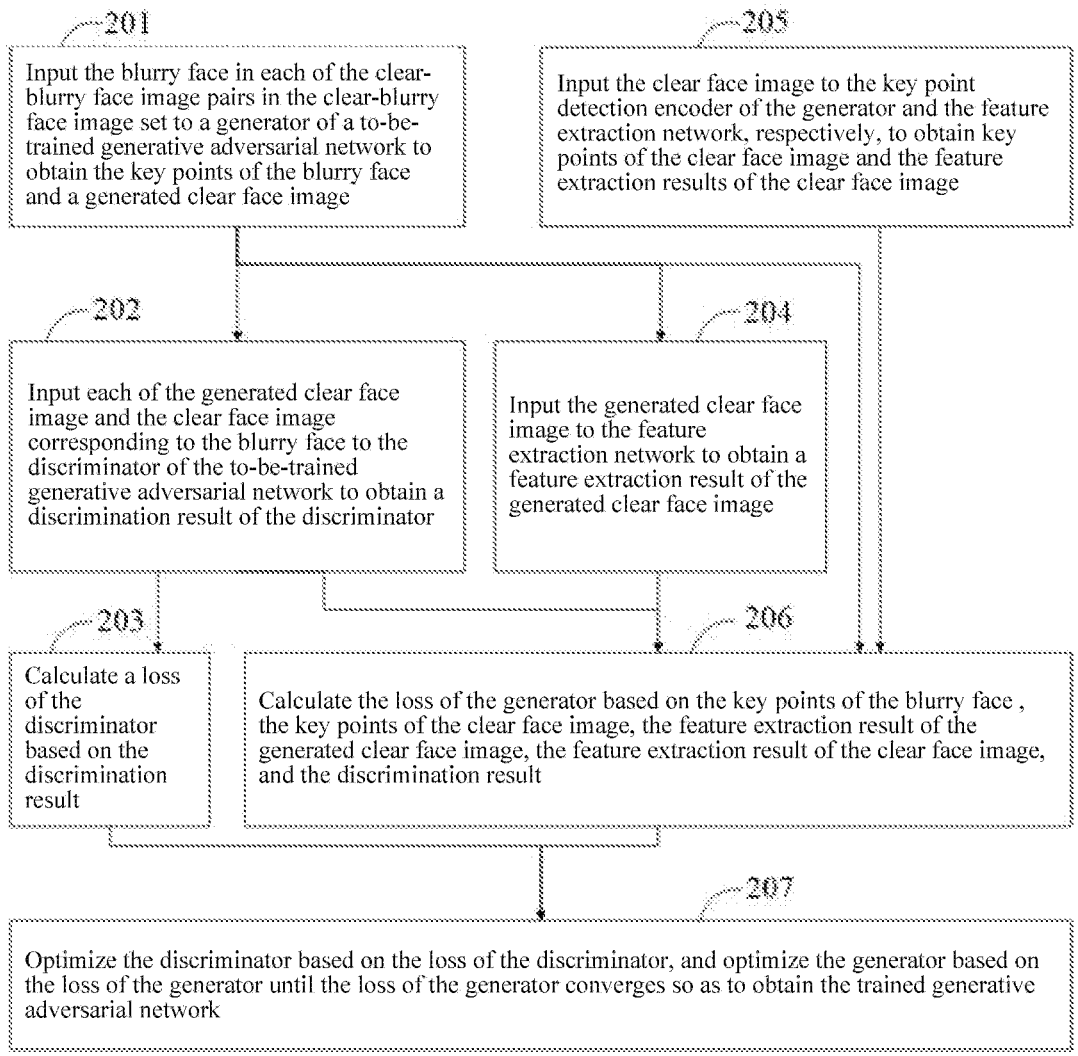
FIG. 2 is a flow chart of training a generative adversarial network according to an embodiment of the present disclosure.

FIG. 2 is a flow chart of training a generative adversarial network according to an embodiment of the present disclosure. As shown in FIG. 2, in this embodiment, before executing the face recognition method shown in FIG. 1, the step of training the generative adversarial network based on each clear-blurry face image pair in the above-mentioned clear-blurry face image set includes the following steps.

201: inputting the blurry face image in each of the clear-blurry face image pairs in the clear-blurry face image set to a generator of a to-be-trained generative adversarial network to obtain the key points of the blurry face image and a generated clear face image.

In this embodiment, the key point detection encoder in the generator is a face key point detection network which can be used to detect 68 or other number of key points of the input face image.

For the face key point detection network, it can be trained independently in advance using the clear face image and the truth value of the key points of each clear face image. In which, the size of the face contained in the clear face image used when training the face key point detection network is a preset size such as 128*128 pixels, and the upper-lower range of the face contained in the clear face image is from the chin to the top of the forehead while the left-right range of the face at least includes both ears. It should be noted that, the training sample used by the face key point detection network is not the clear face image in the above-mentioned clear-blurry face image set, but the clear face images obtained from otherwise. That is, the training sample of the face key point detection network is different from the training sample of the generative adversarial network. After the pre-training of the face key point detection network is completed, the parameters of the face key point detection network are retained, the initial key point detection encoder is obtained, and the training of the generative adversarial network is started. That is, the pre-trained face key point detection network can be used as the key point detection encoder when starts training the generative adversarial network.

For ease of description, the face image input to the key point detection encoder can be denoted as x, then the output obtained by the key point detection encoder based on x can be denoted as key points $G_1(x)$, where the output is a batchsize×1×128×128 matrix. In the matrix, the position values corresponding to the detected key points are 1, and the remaining position values are 0.

Figure 3:
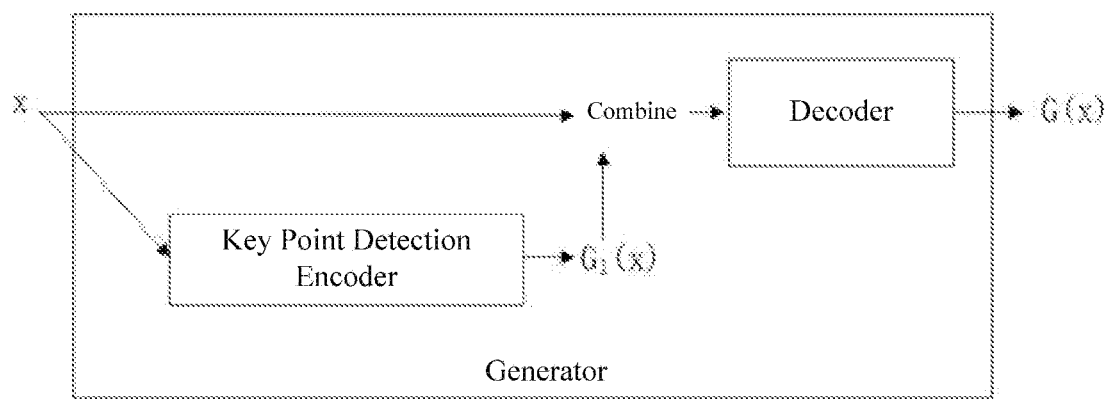
FIG. 3 is a schematic diagram of an example of the operation of a generator according to an embodiment of the present disclosure.

After obtaining the output obtained by the key point detection encoder based on the blurry face image, the output is combined with the corresponding blurry face image. That is, the blurry face image and its key points are combined, and the result of combination will be input to the decoder. The decoder can decode the result of combination, and the output of the decoder is the clear face image corresponding to the blurry face image input to the generator. In this embodiment, since the clear face image is generated by the generator, in order to distinguish it from the clear face image corresponding to the blurry face image in the clear-blurry face image pair, the clear face image generated by the generator based on the blurry face image is referred to as the generated clear face image $G(x)$. FIG. 3 is a schematic diagram of an example of the operation of a generator according to an embodiment of the present disclosure. Referring to FIG. 3, the process of the generator to obtain a corresponding generated clear face image $G(x)$ based on a blurry face image x is shown.

In an example, during training, the value of batchsize is 1. That is, the number of the face images input to the generator each time is 1. For example, the blurry face image x may be a 1×3×128×128 matrix, where 3 is used to represent the RGB three channels of the blurry face image, and 128×128 is used to represent the size of the blurry face image x. Correspondingly, the key points $G_1(x)$ of the blurry face image output by the key point detection encoder is a 1×1×128×128 matrix. The result of the combination of the two is a 1×4×128×128 matrix which will be input to the decoder for decoding, so as to obtain the output result $G(x)$ of the decoder.

202: inputting each of the generated clear face image and the clear face image corresponding to the blurry face image to the discriminator of the to-be-trained generative adversarial network to obtain a discrimination result of the discriminator.

In this embodiment, the discriminator is configured to perform classification tasks, which distinguishes that the input clear face image is a real clear face image (i.e., the clear face image stored in the clear-blurry face image set) or a clear face image generated by the generator (i.e., the generated clear face image). Based on this, the input data of the discriminator of the generative adversarial network during training is the generated clear face image output by the generator based on a blurry face image, and the clear face image corresponding to the blurry face image in the clear-blurry face image set.

203: calculating a loss of the discriminator based on the discrimination result.

In this embodiment, after the discriminator outputs the discrimination result, the loss of the discriminator can be calculated based on the discrimination result, where the true value of the generated clear face image output by the generator based on a blurry face image is 0, and the truth value of the clear face image corresponding to the blurry face image in the clear-blurry face image set is 1. The above-mentioned loss of the discriminator is actually the cross entropy of the classification task it performs, which can be denoted as $L_D$.

204: inputting the generated clear face image to the feature extraction network to obtain a feature extraction result of the generated clear face image.

In this embodiment, in addition to being input to the discriminator, the generated clear face image is also input to the trained feature extraction network which is the feature extraction network in step 102. Through the feature extraction network, the feature extraction result of the above-mentioned generated clear face image can be obtained. It should be noted that, in this embodiment, the order of the execution of step 204 and step 202 will not be limited.

205: inputting the clear face image to the key point detection encoder of the generator and the feature extraction network, respectively, to obtain key points of the clear face image and the feature extraction results of the clear face image.

In this embodiment, the clear face image (that is, the real clear face image) corresponding to the above-mentioned blurry face image is not only input to the discriminator, but also input to the generator and the feature extraction network. Correspondingly, the key points of the clear face image that are output by the key point detection encoder of the generator and the feature extraction result of the clear face image output by the feature extraction network can be obtained. It should be noted that, in this embodiment, the order of the execution of step 205 and step 201 will not be limited.

206: calculating the loss of the generator based on the key points of the blurry face image, the key points of the clear face image, the feature extraction result of the generated clear face image, the feature extraction result of the clear face image, and the discrimination result.

In this embodiment, the key points of the blurry face image and the key points of the corresponding clear face image can be used to calculate the loss $L_{Landmark}$ of the key point detection encoder. The calculation process includes steps of: calculating an average distance between each key point of the blurry face image and a corresponding key point of the clear face image, and taking the average distance as the loss $L_{Landmark}$. That is, the loss $L_{Landmark}=(D_{1-1'}+D_{2-2'}+\ldots+D_{68-68'})\div 68$, where $D_{i-i'}$ refers to the distance between the i-th key point of the blurry face image and the i-th key point of the corresponding clear face image, where $i=1, 2, 3, \ldots,$ and 68.

Considering that the generated clear face image is an image generated based on a blurry face image, while the clear face image is a real image corresponding to the blurry face image, the feature extraction result of the generated clear face image and the feature extraction result of the clear face image can be used to calculate the loss $L_{Feature}$ between the features of the two images through steps of: calculating a feature loss value between the feature extraction result of the generated clear face image and the feature extraction result of the above-mentioned clear face image based on the quadratic loss function (i.e., the L2 loss) of the feature extraction network, and taking the feature loss value as the loss $L_{Feature}$.

The discrimination result can be used to calculate the cross entropy of the discriminator so as to obtain the loss $L_D$ of the discriminator.

Finally, the loss $L_G$ of the generator can be expressed as:

$$L_G=L_D+\alpha L_{Feature}+\beta L_{Landmark};$$

where, $\alpha$ and $\beta$ are both hyperparameters.

207: optimizing the discriminator based on the loss of the discriminator, and optimizing the generator based on the loss of the generator until the loss of the generator converges so as to obtain the trained generative adversarial network.

In this embodiment, the discriminator can be optimized based on the loss of the discriminator; at the same time, the generator can be optimized based on the loss of the generator, to be specifically, optimizing the key point detection encoder of the generator. The sign of the completion of training is that the loss $L_G$ has reached convergence. That is, if the calculated loss $L_G$ is less than a preset loss threshold, the training of the generative adversarial network is considered to be completed, the training can be ended, then the generator at this time can be put into use, and then step 101 and subsequent steps can be start to execute.

It should be noted that, before training the generative adversarial network, a maximum training round can be set. In this embodiment, the initial training round "epoch" is 0. If one round of training has completed based on all the clear-blurry face image pairs in the clear-blurry face image set, the training round epoch is increased by 1; and if the round epoch reaches the maximum training round or the training round epoch does not reach the maximum training round but the loss $L_G$ is already less than the preset loss threshold, the training is ended.

Figure 4:
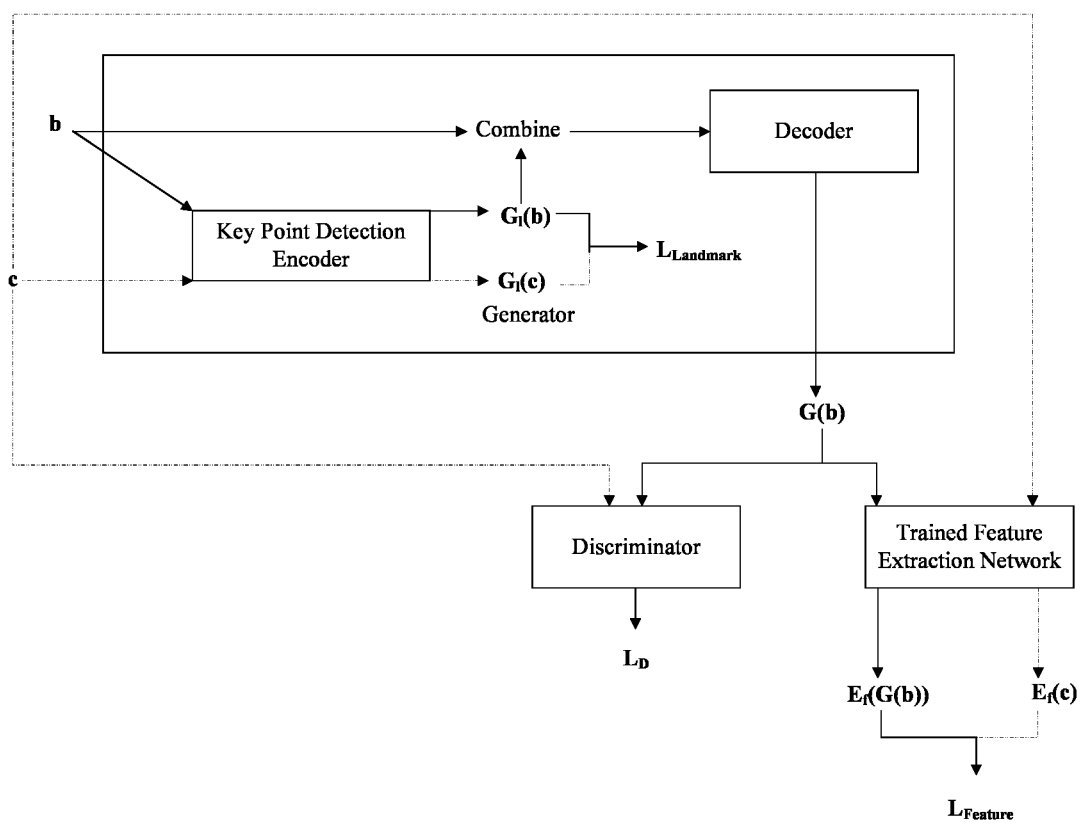
FIG. 4 is a schematic diagram of training a generative adversarial network according to an embodiment of the present disclosure.

FIG. 4 is a schematic diagram of training a generative adversarial network according to an embodiment of the present disclosure. Referring to FIG. 4, the process of training the generative adversarial network will be shown using a clear-blurry face image pair:

The clear face image in the clear-blurry face image pair is denoted as c, and the blurry face image is denoted as b. The dotted lines in FIG. 4 are all operations associated with the clear face image c.

First, the electronic device can respectively input the clear face image c and the blurry face image b into the key point detection encoder of the generator to obtain key points $G_1(c)$ output by the key point detection encoder based on the clear face image c and key points $G_1(b)$ output based on the blurry face image b, and calculate the average distance $L_{Landmark}$ between the key points corresponding to the key points $G_1(c)$ and the key points $G_1(b)$.

Then, the electronic device combines the blurry face image b and the key points $G_1(b)$ to input to the decoder so as to obtain a generated clear face image G(b) output by the decoder. The generated clear face image G(b) and the clear face image c are input into the discriminator, and the cross-entropy $L_D$ of the classification task of the discriminator can be calculated based on the discrimination result of the discriminator. The electronic device can optimize the discriminator based on the cross-entropy $L_D$.

In addition, the electronic device further respectively inputs the generated clear face image G(b) and the clear face image c into the trained feature extraction network to obtain the facial feature $E_f(G(b))$ of the generated clear face image G(b) output by the feature extraction network and the facial feature $E_f(c)$ of the clear face image c so as to calculate the loss $L_{Feature}$ based thereon, where the loss $L_{Feature}$ is the L2 loss of the facial feature $E_f(G(b))$ and the facial feature $E_f(c)$.

Finally, the loss $L_G$ of the generator is calculated based on the formula of $L_G=L_D+\alpha L_{Feature}+\beta L_{Landmark}$. The electronic device can optimize the generator based on the loss $L_G$.

It should be noted that, the generative adversarial network is trained by the above-mentioned process based on each clear-blurry face image pair in the clear-blurry face image set to realize continuous optimization of the generator and discriminator until the training is completed.

Figure 5:
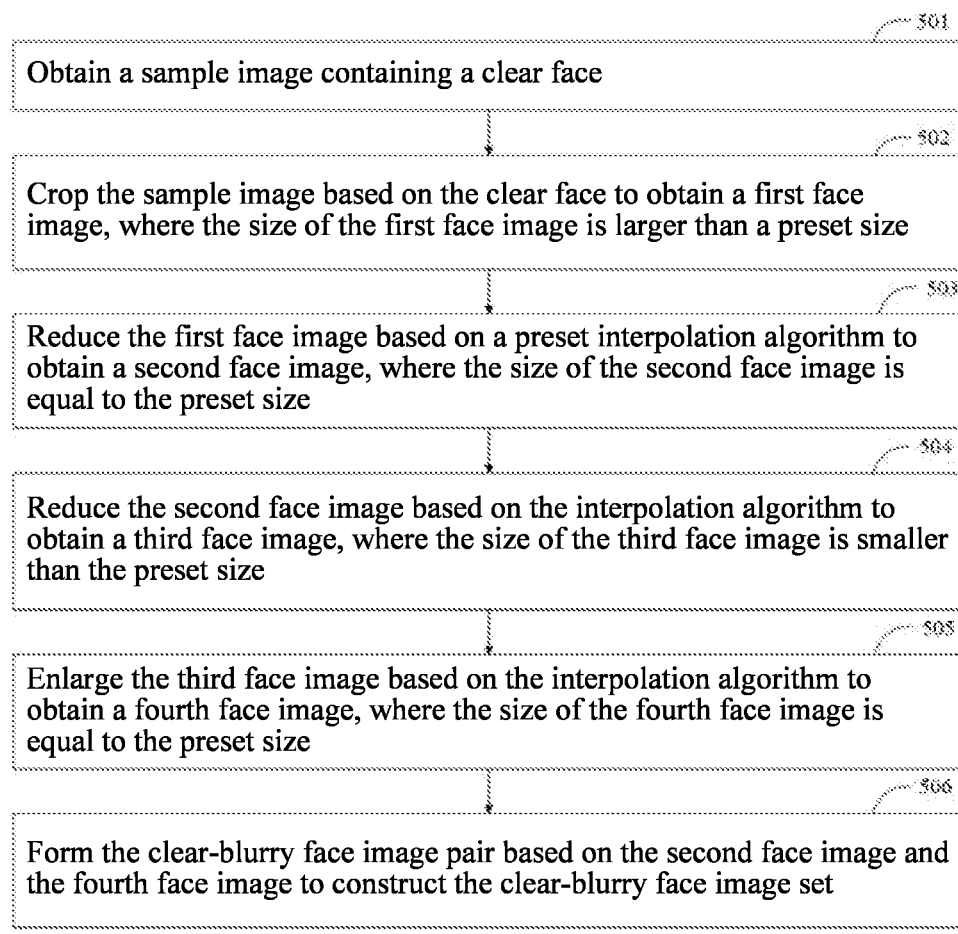
FIG. 5 is a flow chart of constructing a clear-blurry face image set according to an embodiment of the present disclosure.

FIG. 5 is a flow chart of constructing a clear-blurry face image set according to an embodiment of the present disclosure. As shown in FIG. 5, in this embodiment, before training the generative adversarial network, the construction of the clear-blurry face image set includes the following steps.

501: obtaining a sample image containing a clear face.

In this embodiment, considering that it is difficult to collect the blurry image, while the clear image corresponding to the blurry image needs to be obtained, that is, the difference between the two images in a clear-blurry image pair is only the degree of blur, which is difficult to achieve directly through collection. Therefore, the blurry image is obtained by generating based on the clear image. The electronic device can first obtain a large number of sample images containing clear faces collected by different devices having a camera (e.g., smart phone and webcam), and the size of these sample images can be different.

502: cropping the sample image based on the clear face to obtain a first face image, where the size of the first face image is larger than a preset size.

In this embodiment, the sample image is cropped to crop out the clear face contained in the sample image. The clear face refers to an area where a face having the upper-lower range from the chin to the top of the forehead and the left-right range including at least both ears is located, which can be a square. After the cropping, the electronic device can detect the size of the retained face image, and remove the face image whose size is less than or equal to the preset size. After the removal, the retained face image can be denoted as the first face image. As an example, the above-mentioned preset size may be 128*128 pixels.

503: reducing the first face image based on a preset interpolation algorithm to obtain a second face image, where the size of the second face image is equal to the preset size.

In this embodiment, the electronic device can use the "resize" function of OpenCV to reduce each first face image based on a preset interpolation algorithm. It should be noted that, in order to enrich the data, a variety of interpolation algorithms can be used to respectively reduce each first face image. For example, five algorithms of nearest neighbor interpolation, bilinear interpolation, resampling using pixel region relations, bicubic interpolation in 4×4 pixels neighborhoods, and Lanczos interpolation in 8×8 pixels neighborhoods can be used to reduce each first face image. That is, a first face image can be processed five times to obtain 5 corresponding second face images, thereby realizing the replicate of the number of face images. It should be noted that, the size of each second face image obtained in this step is equal to the preset size.

504: reducing the second face image based on the interpolation algorithm to obtain a third face image, where the size of the third face image is smaller than the preset size.

In this embodiment, the electronic device can continue to use the resize function of OpenCV to reduce each second face image based on the preset interpolation algorithm. It should be noted that, in order to enrich the data, a variety of interpolation algorithms can be used to reduce each second face image. Furthermore, one interpolation algorithm can be applied to the same second face image multiple times so that a plurality of third face images of different sizes (that is, different reduction multiples) can be obtained based on an interpolation algorithm through one second face image. For example, five algorithms of nearest neighbor interpolation, bilinear interpolation, resampling using pixel region relations, bicubic interpolation in 4×4 pixels neighborhoods, and Lanczos interpolation in 8×8 pixels neighborhoods can be used to reduce each second face image, and each interpolation algorithm can correspondingly reduce by 3, 4, 6, and 8 times to obtain the third face image of 43*43 pixels, 32*32 pixels, 21*21 pixels, and 16*16 pixels. That is, a second face image can be reduced by five interpolation algorithms, respectively, and each interpolation algorithm can output four corresponding third face images of different sizes during reducing. In this way, through this step, one second face image can be used to obtain 20 corresponding third face images, thereby realizing the duplicate of the number of images. It should be noted that, the size of each third face image obtained in this step is smaller than the preset size.

505: enlarging the third face image based on the interpolation algorithm to obtain a fourth face image, where the size of the fourth face image is equal to the preset size.

In this embodiment, the electronic device can continue to use the resize function of OpenCV to reduce each third face image based on the preset interpolation algorithm. It should be noted that, in order to enrich the data, a variety of interpolation algorithms can be used to enlarge each third face image. For example, five algorithms of nearest neighbor interpolation, bilinear interpolation, resampling using pixel region relations, bicubic interpolation in 4×4 pixels neighborhoods, and Lanczos interpolation in 8×8 pixels neighborhoods can be used to enlarge each third face image. That is, a third face image can be processed five times to obtain 5 corresponding fourth face images, thereby realizing the duplicate of the number of images. It should be noted that, the size of each fourth face image obtained in this step is equal to the preset size.

506: forming the clear-blurry face image pair based on the second face image and the fourth face image to construct the clear-blurry face image set.

In this embodiment, the second face image is a clear face image with the preset size, and the fourth face image is a blur face image with the preset size. After a second face image is processed in step 504, 20 third face images can be obtained correspondingly. After each third face image is processed in step 505, 5 fourth face images can be obtained correspondingly. Then, 100 (that is, 20*5) fourth face images can finally be obtained through one second face image. That is, each second face image can form 100 clear-blur face image pairs with the corresponding 100 fourth face images, so as to realize the construction of the clear-blur face image set.

Figure 6:
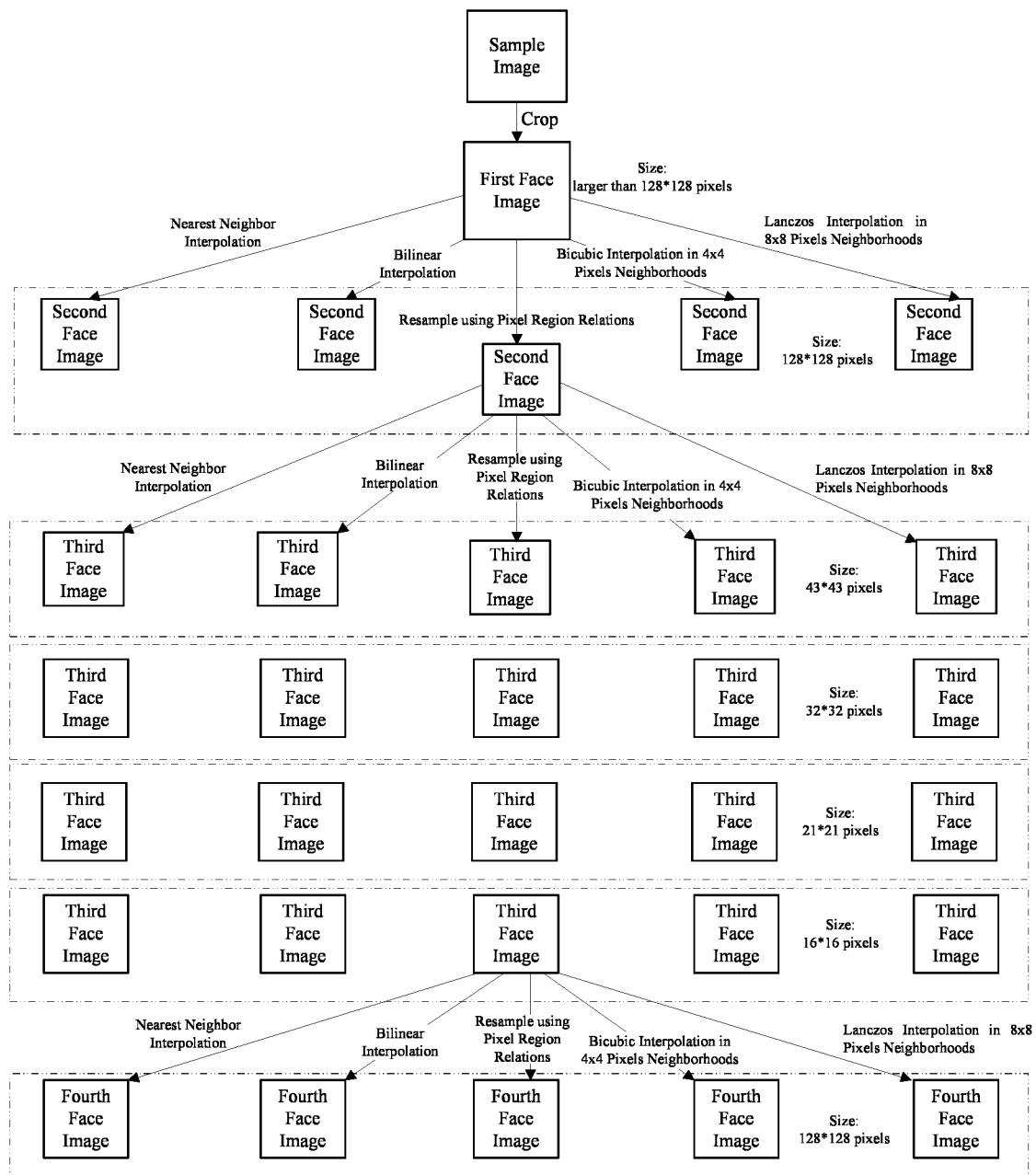
FIG. 6 is a schematic diagram showing the duplicate of the number of the face images when forming a clear-blurry face image set according to an embodiment of the present disclosure.

FIG. 6 is a schematic diagram showing the duplicate of the number of the face images when forming a clear-blurry face image set according to an embodiment of the present disclosure. Referring to FIG. 6, the duplicate of the number of the face images in the above-mentioned steps 501-506 is shown. Due to space limitations, not all of the images are shown. It can be seen that, through the above-mentioned steps 501-506, a large number of training samples that can be used to train the generative adversarial network can be quickly obtained, so as to construct the clear-blurry face image set. In which, the first face image is transformed into the second face image, and the times of the duplicate of the number is 5; the second face image is transformed into the third face image, and the times of the duplicate of the number is 20; the third face image is transformed into the fourth face image, the times of the duplicate of the number is still 5. That is, for a sample image containing a clear face, 500 fourth face images can be finally obtained, that is, 500 clear-blurry face image pairs can be finally obtained.

It should be noted that, the preset interpolation algorithm used in the above-mentioned process is not limited to the five algorithms of nearest neighbor interpolation, bilinear interpolation, resampling using pixel region relations, bicubic interpolation in 4×4 pixels neighborhoods, and Lanczos interpolation in 8×8 pixels neighborhoods, and the electronic device can select other interpolation algorithms to scale the face images according to the needs. In addition, the electronic device can also use fewer or more interpolation algorithms to scale the face images, which is not limited herein.

It can be seen from the forgoing that, through this embodiment, the generative adversarial network pays attention to the facial feature of the blurry facial images during training, so that the deblurring process and the recognition process can be organically combined. When the generator of the trained generative adversarial network is put into use, the to-be-recognized clear face image generated by the generator based on the to-be-recognized blurry face can retain the unique feature information of the face, which can improve the accuracy of the face recognition for the to-be-recognized clear face image to a certain extent.

It should be understood that, the sequence of the serial number of the steps in the above-mentioned embodiments does not mean the execution order while the execution order of each process should be determined by its function and internal logic, which should not be taken as any limitation to the implementation process of the embodiments.

Corresponding to the above-mentioned face recognition method, an embodiment of the present disclosure also provides a face recognition apparatus. FIG. 7 is a schematic block diagram of a face recognition apparatus according to an embodiment of the present disclosure. The above-mentioned face recognition apparatus can be integrated into an electronic device having a camera such as an electronic device as shown in FIG. 8. Referring to FIG. 7, in this embodiment, a face recognition apparatus 700 includes:

a blurry removing unit 701 configured to input a to-be-recognized blurry face image into a generator of a trained generative adversarial network to obtain a to-be-recognized clear face image, where a training sample of the generative adversarial network is obtained from a preset clear-blurry face image set, the clear-blurry face image set includes one or more clear-blurry face image pairs, the generator is composed of a key point detection encoder and a decoder, and the key point detection encoder is for detecting key points of the blurry face image inputted to the generator; where during training the generative adversarial network, an output of the generator is coupled to each of an input of a discriminator of the generative adversarial network and an input of a trained feature extraction network, and a loss of the generator is associated with the key point detection encoder, the feature extraction network, and the discriminator;

a feature extracting unit 702 configured to input the to-be-recognized clear face image to the feature extraction network to obtain a facial feature of the to-be-recognized clear face image;

a feature matching unit 703 configured to match the facial feature of the to-be-recognized clear face image with each user facial feature in a preset facial feature database to determine the user facial feature best matching the to-be-recognized clear face image as a target user facial feature; and a result determining unit 704 configured to determine a user associated with the target user facial feature as a recognition result.

In one embodiment, the above-mentioned face recognition apparatus 700 further includes:

a first obtaining unit configured to input the blurry face image in each of the clear-blurry face image pairs in the clear-blurry face image set to a generator of a to-be-trained generative adversarial network to obtain the key points of the blurry face image and a generated clear face image;

a second obtaining unit configured to input each of the generated clear face image and the clear face image corresponding to the blurry face image to the discriminator of the to-be-trained generative adversarial network to obtain a discrimination result of the discriminator;

a third acquiring unit configured to input the generated clear face image to the feature extraction network to obtain a feature extraction result of the generated clear face image;

a fourth obtaining unit configured to input the clear face image to the key point detection encoder of the generator and the feature extraction network, respectively, to obtain key points of the clear face image and the feature extraction results of the clear face image;

a discriminator loss calculating unit configured to calculate a loss of the discriminator based on the discrimination result;

a generator loss calculating unit configured to calculate the loss of the generator based on the key points of the blurry face image, the key points of the clear face image, the feature extraction result of the generated clear face image, the feature extraction result of the clear face image, and the discrimination result; and an optimization unit configured to optimize the discriminator based on the loss of the discriminator, and optimize the generator based on the loss of the generator until the loss of the generator converges so as to obtain the trained generative adversarial network.

In one embodiment, the generator loss calculating unit includes:

a first calculating subunit configured to calculate an average distance between each key point of the blurry face image and a corresponding key point of the clear face image;

a second calculating subunit configured to calculate a feature loss value between the feature extraction result of the generated clear face image and the feature extraction result of the clear face image based on a loss function of the feature extraction network;

a third calculating subunit configured to calculate a cross entropy of the discriminator based on the discrimination result; and a fourth calculating subunit configured to calculate the loss of the generator based on the average distance, the feature loss value, and the cross entropy.

In one embodiment, the above-mentioned face recognition apparatus 700 further includes:

a sample image obtaining unit configured to obtain a sample image containing a clear face;

a sample image cropping unit configured to crop the sample image based on the clear face to obtain a first face image, where the size of the first face image is larger than a preset size;

a first image reducing unit configured to reduce the first face image based on a preset interpolation algorithm to obtain a second face image, where the size of the second face image is equal to the preset size;

a second image reducing unit configured to reduce the second face image based on the interpolation algorithm to obtain a third face image, where the size of the third face image is smaller than the preset size;

an image enlarging unit configured to enlarge the third face image based on the interpolation algorithm to obtain a fourth face image, where the size of the fourth face image is equal to the preset size; and an image pair forming unit configured to form the clear-blurry face image pair based on the second face image and the fourth face image to construct the clear-blurry face image set.

In one embodiment, the above-mentioned face recognition apparatus 700 further includes:

a user face image obtaining unit configured to obtain a user face image of each user; and a user facial feature extracting unit configured to input each user face image to the feature extraction network to obtain the user facial feature of each user to construct the facial feature database.

In one embodiment, the above-mentioned feature matching unit 703 includes:

a cosine similarity calculating subunit configured to calculate a cosine similarity between the facial feature of the to-be-recognized clear face image and each user facial feature; and a target user facial feature determining subunit configured to determine the user facial feature corresponding to calculated highest cosine similarity as the target user facial feature.

In some embodiments, the blurry removing unit 701 is further configured to capture an image of a to-be-recognized face through a camera of the face recognition apparatus 700; detect the quality of the captured image based on a preset quality detection model to determine whether the captured image is blurry; and determine the captured image as the to-be-recognized blurry face image, in response to the captured image being blurry. In one embodiment, the above-mentioned target user facial feature determining subunit is configured to compare the highest cosine similarity with a preset cosine similarity threshold; and determine the user facial feature corresponding to the highest cosine similarity as the target user facial feature, in response to the highest cosine similarity being greater than the cosine similarity threshold.

It can be seen from the forgoing that, through this embodiment, the generative adversarial network pays attention to the facial feature of the blurry facial images during training, so that the deblurring process and the recognition process can be organically combined. When the generator of the trained generative adversarial network is put into use, the to-be-recognized clear face image generated by the generator based on the to-be-recognized blurry face can retain the unique feature information of the face, which can improve the accuracy of the face recognition for the to-be-recognized clear face image to a certain extent.

Corresponding to the above-mentioned face recognition method, an embodiment of the present disclosure also provides an electronic device. FIG. 8 is a schematic block diagram of an electronic device according to an embodiment of the present disclosure. Referring to FIG. 8, in this embodiment, an electronic device 8 includes a storage 801, one or more processors 802 (only one shown in FIG. 8), a computer program stored in the storage 801 and executable on the processor, and a camera. The storage 801 is configured to store software programs and modules, and the processor 802 performs various functions and data processing by executing the software programs and units stored in the storage 801 so as to obtain resources corresponding to preset events. Specifically, the processor 802 implements the following steps when executing the foregoing computer program stored in the storage 801:

inputting a to-be-recognized blurry face image into a generator of a trained generative adversarial network to obtain a to-be-recognized clear face image, where a training sample of the generative adversarial network is obtained from a preset clear-blurry face image set, the clear-blurry face image set includes one or more clear-blurry face image pairs, the generator is composed of a key point detection encoder and a decoder, and the key point detection encoder is for detecting key points of the blurry face image inputted to the generator; where during training the generative adversarial network, an output of the generator is coupled to each of an input of a discriminator of the generative adversarial network and an input of a trained feature extraction network, and a loss of the generator is associated with the key point detection encoder, the feature extraction network, and the discriminator;

inputting the to-be-recognized clear face image to the feature extraction network to obtain a facial feature of the to-be-recognized clear face image;

matching the facial feature of the to-be-recognized clear face image with each user facial feature in a preset facial feature database to determine the user facial feature best matching the to-be-recognized clear face image as a target user facial feature; and determining a user associated with the target user facial feature as a recognition result.

In some embodiments, the processor 802 further implements the following steps: capturing an image of a to-be-recognized face through the camera; detecting the quality of the captured image based on a preset quality detection model to determine whether the captured image is blurry; and determining the captured image as the to-be-recognized blurry face image, in response to the captured image being blurry. Assuming that the foregoing is the first possible implementation manner, in the second possible implementation manner provided on the basis of the first possible implementation manner, before the step of inputting the to-be-recognized blurry face image into the generator of the trained generative adversarial network to obtain the to-be-recognized clear face image, the processor 802 further implements the following steps by executing the above-mentioned computer program stored in the storage 801:

inputting the blurry face image in each of the clear-blurry face image pairs in the clear-blurry face image set to a generator of a to-be-trained generative adversarial network to obtain the key points of the blurry face image and a generated clear face image;

inputting each of the generated clear face image and the clear face image corresponding to the blurry face image to the discriminator of the to-be-trained generative adversarial network to obtain a discrimination result of the discriminator;

calculating a loss of the discriminator based on the discrimination result;

inputting the generated clear face image to the feature extraction network to obtain a feature extraction result of the generated clear face image;

inputting the clear face image to the generator and the feature extraction network, respectively, to obtain key points of the clear face image and the feature extraction results of the clear face image;

calculating the loss of the generator based on the key points of the blurry face image, the key points of the clear face image, the feature extraction result of the generated clear face image, the feature extraction result of the clear face image, and the discrimination result; and optimizing the discriminator based on the loss of the discriminator, and optimizing the generator based on the loss of the generator until the loss of the generator converges so as to obtain the trained generative adversarial network.

In the third possible implementation manner provided on the basis of the foregoing second possible implementation manner, the step of calculating the loss of the generator based on the key points of the blurry face image, the key points of the clear face image, the feature extraction result of the generated clear face image, the feature extraction result of the clear face image, and the discrimination result includes steps of:

calculating an average distance between each key point of the blurry face image and a corresponding key point of the clear face image;

calculating a feature loss value between the feature extraction result of the generated clear face image and the feature extraction result of the clear face image based on a loss function of the feature extraction network;

calculating a cross entropy of the discriminator based on the discrimination result; an calculating the loss of the generator based on the average distance, the feature loss value, and the cross entropy.

In the fourth possible implementation manner provided on the basis of the above-mentioned first possible implementation manner, before the step of inputting the to-be-recognized blurry face image into the generator of the trained generative adversarial network to obtain the to-be-recognized clear face image, the processor 802 further implements the following steps when executing the above-mentioned computer program stored in the storage 801:

obtaining a sample image containing a clear face;

cropping the sample image based on the clear face to obtain a first face image, where the size of the first face image is larger than a preset size;

reducing the first face image based on a preset interpolation algorithm to obtain a second face image, where the size of the second face image is equal to the preset size;

reducing the second face image based on the interpolation algorithm to obtain a third face image, where the size of the third face image is smaller than the preset size;

enlarging the third face image based on the interpolation algorithm to obtain a fourth face image, where the size of the fourth face image is equal to the preset size; and forming the clear-blurry face image pair based on the second face image and the fourth face image to construct the clear-blurry face image set.

In the fifth possible implementation manner provided on the basis of the foregoing first possible implementation manner, before the step of matching the facial feature of the to-be-recognized clear face image with each user facial feature in the preset facial feature database, the processor 802 further implements the following steps by executing the above-mentioned computer program stored in the storage 801:

obtaining a user face image of each user; and inputting each user face image to the feature extraction network to obtain the user facial feature of each user to construct the facial feature database.

In the sixth possible implementation manner provided on the basis of the above-mentioned first possible implementation, the above-mentioned second possible implementation, the above-mentioned third possible implementation, the above-mentioned fourth possible implementation, or the above-mentioned fifth possible implementation, the step of matching the facial feature of the to-be-recognized clear face image with each user facial feature in the preset facial feature database to determine the user facial feature best matching the to-be-recognized clear face image as the target user facial feature includes steps of:

calculating a cosine similarity between the facial feature of the to-be-recognized clear face image and each user facial feature; and determining the user facial feature corresponding to calculated highest cosine similarity as the target user facial feature.

In the seventh possible implementation manner provided on the basis of the foregoing sixth possible implementation manner, the step of determining the user facial feature corresponding to calculated highest cosine similarity as the target user facial feature includes steps of:

comparing the highest cosine similarity with a preset cosine similarity threshold; and determining the user facial feature corresponding to the highest cosine similarity as the target user facial feature, in response to the highest cosine similarity being greater than the cosine similarity threshold.

The processor 802 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 801 can include read only memory and random access memory and provides instructions and data to the processor 802. A portion or entire of the storage 801 can also include a non-volatile random access memory. For example, the storage 801 can also store information of the device type.

It can be seen from the forgoing that, through this embodiment, the generative adversarial network pays attention to the facial feature of the blurry facial images during training, so that the deblurring process and the recognition process can be organically combined. When the generator of the trained generative adversarial network is put into use, the to-be-recognized clear face image generated by the generator based on the to-be-recognized blurry face can retain the unique feature information of the face, which can improve the accuracy of the face recognition for the to-be-recognized clear face image to a certain extent.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device) and method may be implemented in other manners. For example, the above-mentioned apparatus embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

When the integrated unit is implemented in the form of a software functional unit and is sold or used as an independent product, the integrated unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer readable memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented face recognition method, comprising steps of:
   inputting a to-be-recognized blurry face image into a generator of a trained generative adversarial network to obtain a to-be-recognized clear face image, wherein a training sample of the generative adversarial network is obtained from a preset clear-blurry face image set, the clear-blurry face image set comprises one or more clear-blurry face image pairs, the generator is composed of a key point detection encoder and a decoder, and the key point detection encoder is for detecting key points of the blurry face image inputted to the generator; wherein during training the generative adversarial network, an output of the generator is coupled to each of an input of a discriminator of the generative adversarial network and an input of a trained feature extraction network, and a loss of the generator is associated with the key point detection encoder, the feature extraction network, and the discriminator;
   inputting the to-be-recognized clear face image to the feature extraction network to obtain a facial feature of the to-be-recognized clear face image;
   matching the facial feature of the to-be-recognized clear face image with each user facial feature in a preset facial feature database to determine the user facial feature best matching the to-be-recognized clear face image as a target user facial feature; and
   determining a user associated with the target user facial feature as a recognition result.

2. The method of claim 1, wherein before the step of inputting the to-be-recognized blurry face image into the generator of the trained generative adversarial network to obtain the to-be-recognized clear face image, the method further comprises steps of:
   inputting the blurry face image in each of the clear-blurry face image pairs in the clear-blurry face image set to a generator of a to-be-trained generative adversarial network to obtain the key points of the blurry face image and a generated clear face image;
   inputting each of the generated clear face image and the clear face image corresponding to the blurry face image to the discriminator of the to-be-trained generative adversarial network to obtain a discrimination result of the discriminator;
   calculating a loss of the discriminator based on the discrimination result;
   inputting the generated clear face image to the feature extraction network to obtain a feature extraction result of the generated clear face image;
   inputting the clear face image to the generator and the feature extraction network, respectively, to obtain key points of the clear face image and the feature extraction results of the clear face image;
   calculating the loss of the generator based on the key points of the blurry face image, the key points of the clear face image, the feature extraction result of the generated clear face image, the feature extraction result of the clear face image, and the discrimination result; and
   optimizing the discriminator based on the loss of the discriminator, and optimizing the generator based on the loss of the generator until the loss of the generator converges so as to obtain the trained generative adversarial network.

3. The method of claim 2, wherein the step of calculating the loss of the generator based on the key points of the blurry face image, the key points of the clear face image, the feature extraction result of the generated clear face image, the feature extraction result of the clear face image, and the discrimination result comprises steps of:

calculating an average distance between each key point of the blurry face image and a corresponding key point of the clear face image;

calculating a feature loss value between the feature extraction result of the generated clear face image and the feature extraction result of the clear face image based on a loss function of the feature extraction network;

calculating a cross entropy of the discriminator based on the discrimination result; and calculating the loss of the generator based on the average distance, the feature loss value, and the cross entropy.

4. The method of claim 1, wherein before the step of inputting the to-be-recognized blurry face image into the generator of the trained generative adversarial network to obtain the to-be-recognized clear face image, the method further comprises steps of:

obtaining a sample image containing a clear face;

cropping the sample image based on the clear face to obtain a first face image, wherein the size of the first face image is larger than a preset size;

reducing the first face image based on a preset interpolation algorithm to obtain a second face image, wherein the size of the second face image is equal to the preset size;

reducing the second face image based on the interpolation algorithm to obtain a third face image, wherein the size of the third face image is smaller than the preset size;

enlarging the third face image based on the interpolation algorithm to obtain a fourth face image, wherein the size of the fourth face image is equal to the preset size; and forming the clear-blurry face image pair based on the second face image and the fourth face image to construct the clear-blurry face image set.

5. The method of claim 1, wherein before the step of matching the facial feature of the to-be-recognized clear face image with each user facial feature in the preset facial feature database, the method further comprises steps of:

obtaining a user face image of each user; and inputting each user face image to the feature extraction network to obtain the user facial feature of each user to construct the facial feature database.

6. The method of claim 1, wherein the step of matching the facial feature of the to-be-recognized clear face image with each user facial feature in the preset facial feature database to determine the user facial feature best matching the to-be-recognized clear face image as the target user facial feature comprises steps of:

calculating a cosine similarity between the facial feature of the to-be-recognized clear face image and each user facial feature; and determining the user facial feature corresponding to calculated highest cosine similarity as the target user facial feature.

7. The method of claim 6, wherein the step of determining the user facial feature corresponding to calculated highest cosine similarity as the target user facial feature comprises steps of:

comparing the highest cosine similarity with a preset cosine similarity threshold; and determining the user facial feature corresponding to the highest cosine similarity as the target user facial feature, in response to the highest cosine similarity being greater than the cosine similarity threshold.

8. The method of claim 1, wherein before the step of inputting the to-be-recognized blurry face image into the generator of the trained generative adversarial network to obtain the to-be-recognized clear face image, the method further comprises steps of:

capturing an image of a to-be-recognized face through a camera;

detecting the quality of the captured image based on a preset quality detection model to determine whether the captured image is blurry; and determining the captured image as the to-be-recognized blurry face image, in response to the captured image being blurry.

9. A face recognition apparatus, comprising:

a memory;

a processor; and one or more computer programs stored in the memory and executable on the processor, wherein the one or more computer programs comprise:

instructions for inputting a to-be-recognized blurry face image into a generator of a trained generative adversarial network to obtain a to-be-recognized clear face image, wherein a training sample of the generative adversarial network is obtained from a preset clear-blurry face image set, the clear-blurry face image set comprises one or more clear-blurry face image pairs, the generator is composed of a key point detection encoder and a decoder, and the key point detection encoder is for detecting key points of the blurry face image inputted to the generator; wherein during training the generative adversarial network, an output of the generator is coupled to each of an input of a discriminator of the generative adversarial network and an input of a trained feature extraction network, and a loss of the generator is associated with the key point detection encoder, the feature extraction network, and the discriminator;

instructions for inputting the to-be-recognized clear face image to the feature extraction network to obtain a facial feature of the to-be-recognized clear face image;

instructions for matching the facial feature of the to-be-recognized clear face image with each user facial feature in a preset facial feature database to determine the user facial feature best matching the to-be-recognized clear face image as a target user facial feature; and instructions for determining a user associated with the target user facial feature as a recognition result.

10. The apparatus of claim 9, wherein the one or more computer programs further comprise:

instructions for inputting the blurry face image in each of the clear-blurry face image pairs in the clear-blurry face image set to a generator of a to-be-trained generative adversarial network to obtain the key points of the blurry face image and a generated clear face image;

instructions for inputting each of the generated clear face image and the clear face image corresponding to the blurry face image to the discriminator of the to-be-trained generative adversarial network to obtain a discrimination result of the discriminator;

instructions for calculating a loss of the discriminator based on the discrimination result;

instructions for inputting the generated clear face image to the feature extraction network to obtain a feature extraction result of the generated clear face image;

instructions for inputting the clear face image to the generator and the feature extraction network, respectively, to obtain key points of the clear face image and the feature extraction results of the clear face image;

instructions for calculating the loss of the generator based on the key points of the blurry face image, the key points of the clear face image, the feature extraction result of the generated clear face image, the feature extraction result of the clear face image, and the discrimination result; and instructions for optimizing the discriminator based on the loss of the discriminator, and optimizing the generator based on the loss of the generator until the loss of the generator converges so as to obtain the trained generative adversarial network.

11. The apparatus of claim 10, wherein the instructions for calculating the loss of the generator based on the key points of the blurry face image, the key points of the clear face image, the feature extraction result of the generated clear face image, the feature extraction result of the clear face image, and the discrimination result comprise:

instructions for calculating an average distance between each key point of the blurry face image and a corresponding key point of the clear face image;

instructions for calculating a feature loss value between the feature extraction result of the generated clear face image and the feature extraction result of the clear face image based on a loss function of the feature extraction network;

instructions for calculating a cross entropy of the discriminator based on the discrimination result; and instructions for calculating the loss of the generator based on the average distance, the feature loss value, and the cross entropy.

12. The apparatus of claim 9, wherein the one or more computer programs further comprise:

instructions for obtaining a sample image containing a clear face;

instructions for cropping the sample image based on the clear face to obtain a first face image, wherein the size of the first face image is larger than a preset size;

instructions for reducing the first face image based on a preset interpolation algorithm to obtain a second face image, wherein the size of the second face image is equal to the preset size;

instructions for reducing the second face image based on the interpolation algorithm to obtain a third face image, wherein the size of the third face image is smaller than the preset size;

instructions for enlarging the third face image based on the interpolation algorithm to obtain a fourth face image, wherein the size of the fourth face image is equal to the preset size; and instructions for forming the clear-blurry face image pair based on the second face image and the fourth face image to construct the clear-blurry face image set.

13. The apparatus of claim 9, wherein the one or more computer programs further comprise:

instructions for obtaining a user face image of each user; and instructions for inputting each user face image to the feature extraction network to obtain the user facial feature of each user to construct the facial feature database.

14. The apparatus of claim 9, wherein the instructions for matching the facial feature of the to-be-recognized clear face image with each user facial feature in the preset facial feature database to determine the user facial feature best matching the to-be-recognized clear face image as the target user facial feature comprise:

instructions for calculating a cosine similarity between the facial feature of the to-be-recognized clear face image and each user facial feature; and instructions for determining the user facial feature corresponding to calculated highest cosine similarity as the target user facial feature.

15. The apparatus of claim 14, wherein the instructions for determining the user facial feature corresponding to calculated highest cosine similarity as the target user facial feature comprise:

instructions for comparing the highest cosine similarity with a preset cosine similarity threshold; and instructions for determining the user facial feature corresponding to the highest cosine similarity as the target user facial feature, in response to the highest cosine similarity being greater than the cosine similarity threshold.

16. The apparatus of claim 9, wherein the face recognition apparatus further comprises a camera, and the one or more computer programs further comprise:

instructions for capturing an image of a to-be-recognized face through a camera;

instructions for detecting the quality of the captured image based on a preset quality detection model to determine whether the captured image is blurry; and instructions for determining the captured image as the to-be-recognized blurry face image, in response to the captured image being blurry.

17. A non-transitory computer-readable storage medium storing one or more computer programs executable on a processor to implement a face recognition method, wherein the one or more computer programs comprise:

instructions for inputting a to-be-recognized blurry face image into a generator of a trained generative adversarial network to obtain a to-be-recognized clear face image, wherein a training sample of the generative adversarial network is obtained from a preset clear-blurry face image set, the clear-blurry face image set comprises one or more clear-blurry face image pairs, the generator is composed of a key point detection encoder and a decoder, and the key point detection encoder is for detecting key points of the blurry face image inputted to the generator; wherein during training the generative adversarial network, an output of the generator is coupled to each of an input of a discriminator of the generative adversarial network and an input of a trained feature extraction network, and a loss of the generator is associated with the key point detection encoder, the feature extraction network, and the discriminator;

instructions for inputting the to-be-recognized clear face image to the feature extraction network to obtain a facial feature of the to-be-recognized clear face image;

instructions for matching the facial feature of the to-be-recognized clear face image with each user facial feature in a preset facial feature database to determine the user facial feature best matching the to-be-recognized clear face image as a target user facial feature; and instructions for determining a user associated with the target user facial feature as a recognition result.

18. The storage medium of claim 17, wherein the one or more computer programs further comprise:

instructions for inputting the blurry face image in each of the clear-blurry face image pairs in the clear-blurry face image set to a generator of a to-be-trained generative adversarial network to obtain the key points of the blurry face image and a generated clear face image;

instructions for inputting each of the generated clear face image and the clear face image corresponding to the blurry face image to the discriminator of the to-be-trained generative adversarial network to obtain a discrimination result of the discriminator;

instructions for calculating a loss of the discriminator based on the discrimination result;

instructions for inputting the generated clear face image to the feature extraction network to obtain a feature extraction result of the generated clear face image;

instructions for inputting the clear face image to the generator and the feature extraction network, respectively, to obtain key points of the clear face image and the feature extraction results of the clear face image;

instructions for calculating the loss of the generator based on the key points of the blurry face image, the key points of the clear face image, the feature extraction result of the generated clear face image, the feature extraction result of the clear face image, and the discrimination result; and instructions for optimizing the discriminator based on the loss of the discriminator, and optimizing the generator based on the loss of the generator until the loss of the generator converges so as to obtain the trained generative adversarial network.

19. The storage medium of claim 18, wherein the instructions for calculating the loss of the generator based on the key points of the blurry face image, the key points of the clear face image, the feature extraction result of the generated clear face image, the feature extraction result of the clear face image, and the discrimination result comprise:

instructions for calculating an average distance between each key point of the blurry face image and a corresponding key point of the clear face image;

instructions for calculating a feature loss value between the feature extraction result of the generated clear face image and the feature extraction result of the clear face image based on a loss function of the feature extraction network;

instructions for calculating a cross entropy of the discriminator based on the discrimination result; and instructions for calculating the loss of the generator based on the average distance, the feature loss value, and the cross entropy.

20. The storage medium of claim 17, wherein the one or more computer programs further comprise:

instructions for obtaining a sample image containing a clear face;

instructions for cropping the sample image based on the clear face to obtain a first face image, wherein the size of the first face image is larger than a preset size;

instructions for reducing the first face image based on a preset interpolation algorithm to obtain a second face image, wherein the size of the second face image is equal to the preset size;

instructions for reducing the second face image based on the interpolation algorithm to obtain a third face image, wherein the size of the third face image is smaller than the preset size;

instructions for enlarging the third face image based on the interpolation algorithm to obtain a fourth face image, wherein the size of the fourth face image is equal to the preset size; and instructions for forming the clear-blurry face image pair based on the second face image and the fourth face image to construct the clear-blurry face image set.

* * * * *